United States Patent
Mager et al.

(10) Patent No.: US 7,109,285 B2
(45) Date of Patent: Sep. 19, 2006

(54) PHENOLICALLY BLOCKED POLYURETHANE PREPOLYMERS

(75) Inventors: Michael Mager, Leverkusen (DE); Thomas Stingl, Montabaur (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 10/818,328

(22) Filed: Apr. 5, 2004

(65) Prior Publication Data

US 2004/0202868 A1  Oct. 14, 2004

(30) Foreign Application Priority Data

Apr. 10, 2003  (DE)  ................ 103 16 396

(51) Int. Cl.
*C08G 18/80*  (2006.01)
(52) U.S. Cl. ............ 528/45; 528/53; 528/60; 528/61; 528/73; 525/123
(58) Field of Classification Search ............... 528/45, 528/53, 60, 61, 73
See application file for complete search history.

(56) References Cited

U.S. PATENT DOCUMENTS

| | | | |
|---|---|---|---|
| 3,250,745 A | 5/1966 | Davis et al. | 260/47 |
| 4,281,089 A | 7/1981 | Pazos | 525/456 |
| 5,158,922 A | 10/1992 | Hinney et al. | 502/175 |
| 5,470,813 A | 11/1995 | Le-Khac | 502/175 |
| 5,589,431 A | 12/1996 | Le-Khac | 502/175 |
| 5,731,407 A | 3/1998 | Le-Khac | 528/408 |
| 6,060,574 A | 5/2000 | Schmalstieg et al. | 528/45 |

FOREIGN PATENT DOCUMENTS

| | | | |
|---|---|---|---|
| DE | 19935329 | * | 2/2001 |
| GB | 1 399 257 | | 7/1975 |

OTHER PUBLICATIONS

Ullmanns Encyklopädie der technischen Chemie, 4$^{th}$ Edition, vol. 12, (month unavailable) 1976, pp. 539-545, Willem Barendrecht et al, "Harze, synthetische".

Kirk-Othmer, Encyclopedia of Chemical Technology, 3$^{rd}$ Edition, vol. 12, (month unavailable) 1980, pp. 852-869, "Hydrocarbon Resins".

Encyclopedia of Polymer Science and Engineering, vol. 7, (month unavailable) 1987, pp. 758-782, "Hydrocarbon Resins".

* cited by examiner

*Primary Examiner*—Rachel Gorr
(74) *Attorney, Agent, or Firm*—Joseph C. Gil; Thomas W. Roy

(57) ABSTRACT

The present invention relates to novel polyurethane prepolymers (PU prepolymers) of low viscosity containing NCO groups blocked with compounds containing phenol groups and to their use for producing polyurethane polymers. The PU prepolymers are prepared by reacting one or more diisocyanates or polyisocyanates with at least one isocyanate-reactive compound with a functionality of at least 1.5 to form an NCO-functional polyurethane prepolymer and subsequently blocking the free NCO groups with at least one hydrocarbon resin containing phenolic OH groups and/or one optionally substituted phenol in the presence of a catalyst which comprises at least one triorganoamine.

14 Claims, No Drawings

PHENOLICALLY BLOCKED POLYURETHANE PREPOLYMERS

CROSS REFERENCE TO RELATED PATENT APPLICATION

The present patent application claims the right of priority under 35 U.S.C. § 119 (a)–(d) of German Patent Application No.103 16 396.4, filed Apr. 10, 2003.

FIELD OF THE INVENTION

The present invention relates to novel polyurethane prepolymers (PU prepolymers) of low viscosity containing NCO groups blocked with compounds containing phenol groups, to a process for preparing them and to their use for producing polyurethane polymers.

BACKGROUND OF THE INVENTION

Features of the polyamine/epoxy resin systems known from the prior art include, for example, excellent metal adhesion, very good chemicals resistance and outstanding corrosion protection properties. In the case of solvent-borne formulations and powder coating systems it is possible using epoxy resins with high molar masses and/or polyaminoamides, based for example on dimer fatty acid hardeners, to obtain crosslinked films of high flexibility. Coatings based on solvent-free liquid resins and solvent-free amine-type hardeners, owing to the low molar masses of the epoxy resins and the resulting high network density, are very brittle. In solvent-free formulations, therefore, use is made of, for example, tar substitutes such as coumarone resins for plasticization. Especially when relatively large amounts of hydrocarbon resins are used, however, coatings of this kind tend towards long-term embrittlement owing to migration of the non-functional constituents.

Effective and long-lasting elasticization of the epoxy resins can be achieved through combination with blocked polyurethane prepolymers.

DE-A 21 52 606 describes in this context the use of alkylphenol-blocked polyisocyanates, the reactive systems produced (e.g. coating materials or composite materials) being of relatively high viscosity.

An improvement in this respect can be obtained, according to the teaching of U.S. Pat. No. 6,060,574, by using hydrocarbon-resin-blocked polyurethane prepolymers, in which case reactive systems of lower viscosity are obtained.

Catalysts described as suitable for the blocking reaction in DE-A 21 52 606 and U.S. Pat. No. 6,060,574 are, very generally, the catalysts which are customary per se in polyurethane chemistry, including Sn(II) or Sn(IV) compounds or tertiary amines such as 1,4-diazabicyclo[2.2.2]octane (DABCO) or triethylamine.

However, the only two tertiary amines mentioned explicitly, DABCO and $NEt_3$, have unwanted drawbacks. For instance, the deactivation of the catalyst after the blocking reaction, which is normally carried out with acid chlorides such as benzyl chloride, leads to unwanted precipitation and clouding phenomena in the product, so making it unusable. Owing to its high volatility (boiling point: 88–90° C.), in contrast, triethylamine is readily expelled from the reaction mixture during the blocking reaction (reaction temperatures typically up to 90–120° C.), and this leads, among other things, to a reaction rate which is not uniform, is difficult to control and in some cases is severely retarded.

SUMMARY OF THE INVENTION

The present invention is directed to a process for preparing phenolically blocked polyurethane prepolymers. The process includes
reacting
a) one or more diisocyanates or polyisocyanates with
b) at least one isocyanate-reactive compound with a functionality of at least 1.5 to form an NCO-functional polyurethane prepolymer; and subsequently blocking the free NCO groups with
c) at least one hydrocarbon resin containing phenolic OH groups and/or one optionally substituted phenol
d) in the presence of a catalyst.

The catalyst includes at least one triorganoamine selected from
i) compounds of the general formula (I)

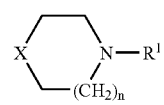

(I)

where
$R^1$ is an optionally branched $C_1$–$C_{30}$ alkyl radical,
X is O, S or the group N—$R^1$ and
n is 0 or 1, and
ii) compounds of the general formula (II)

 (II)

where
$R^2$ is a $C_3$–$C_{30}$ alkyl, $C_3$–$C_{10}$ cycloalkyl or $C_6$–$C_{30}$ aryl radical and/or the radical —$(Y)_p(CHR^5)_q NR^6R^7$, in which q=1 to 5 and $R^5$, $R^6$ and $R^7$ independently of one another are a $C_1$–$C_{30}$ alkyl radical and $R^5$ can also be H, and p=0 or 1 and the radical Y is —C(O)O—, —O—, —NH—CO—, —NH— and/or —N($CH_3$)—, $R^3$ and $R^4$ independently of one another are an optionally substituted $C_1$–$C_{30}$ alkyl, $C_3$–$C_{10}$ cycloalkyl or $C_6$–$C_{30}$ aryl radical and/or the radical —$(Y)_p(CHR^5)_q NR^6R^7$, in which q=1 to 5 and $R^5$, $R^6$ and $R^7$ independently of one another are a $C_1$–$C_{30}$ alkyl radical and $R^5$ can also be H, and p=0 or 1 and the radical Y is —C(O)O—, —O—, —NH—CO—, —NH— and/or —N($CH_3$)—.

The present invention is also directed to phenolically blocked polyurethane prepolymers obtained according to the above-described process.

The present invention is further directed to reactive systems that include
A) one or more polyurethane prepolymers obtained according to the above-described process,
B) one or more organic amines having at least two primary amino groups,
C) optionally compounds containing oxirane groups which contain on average more than one oxirane group per molecule,
D) optionally catalysts and/or additives and
E) optionally compounds obtained through reaction of one or more of components A)–D) with one another.

The additives are selected from the group consisting of fillers, solvents, levelling assistants, pigments, solvents, reaction accelerants and viscosity regulators.

The present invention is additionally directed to a method of producing coatings, adhesives, sealants, jointing compounds or mouldings including adding one or more additives as described above to the above-described inventive prepolymers as well as to the resulting Coating, adhesive, sealant, jointing compound or moulding compositions and substrates coated with such coatings.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

It has now been found that the use of special amine-type blocking catalysts which do not have the aforementioned drawbacks of the amine-type catalysts of the prior art in the field of phenolic NCO blocking leads to polyurethane prepolymers of significantly reduced viscosity, so that, from these, novel reactive systems having likewise markedly reduced viscosity and hence improved processing properties can be produced.

The invention accordingly provides a process for preparing phenolically blocked polyurethane prepolymers, in which a) one or more diisocyanates or polyisocyanates are reacted with b) at least one isocyanate-reactive compound with a functionality of at least 1.5 to form an NCO-functional polyurethane prepolymer and subsequently the free NCO groups are blocked with c) at least one hydrocarbon resin containing phenolic OH groups and/or one optionally substituted phenol d) in the presence of a catalyst which comprises at least one triorganoamine of the following types:

i) compounds of the general formula (I)

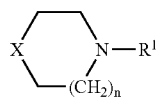

(I)

where $R^1$ is an optionally branched $C_1$–$C_{30}$ alkyl radical,

X is O, S or the group N—$R^1$ and n is 0 or 1, ii) compounds of the general formula (II)

$$NR^2R^3R^4 \quad\quad (II)$$

where $R^2$ is a $C_3$–$C_{30}$ alkyl, $C_3$–$C_{10}$ cycloalkyl or $C_6$–$C_{30}$ aryl radical and/or the radical —$(Y)_p(CHR^5)_qNR^6R^7$, in which q=1 to 5 and $R^5$, $R^6$ and $R^7$ independently of one another are a $C_1$–$C_{30}$ alkyl radical and $R^5$ can also be H, and p=0 or 1 and the radical Y is —C(O)O—, —O—, —NH—CO—, —NH— and/or —N(CH$_3$)—, $R^3$ and $R^4$ independently of one another are an optionally substituted $C_1$–$C_{30}$ alkyl, $C_3$–$C_{10}$ cycloalkyl or $C_6$–$C_{30}$ aryl radical and/or the radical —$(Y)_p(CHR^5)_qNR^6R^7$, in which q=1 to 5 and $R^5$, $R^6$ and $R^7$ independently of one another are a $C_1$–$C_{30}$ alkyl radical and $R^5$ can also be H, and p=0 or 1 and the radical Y is —C(O)O—, —O—, —NH—CO—, —NH— and/or —N(CH$_3$)—.

As triorganoamines of type ii) of component d) it is preferred to use compounds of the formula (III)

$$N(CH_3)_x R^8_{3-x} \quad\quad (III)$$

where x is 1 or 2, $R^8$ is an optionally branched and/or substituted $C_3$–$C_{30}$ alkyl radical or $C_5$–$C_6$ cycloalkyl radical or the radical —(N(CH$_3$))$_p$(CH$_2$)$_q$NR$^6$R$^7$, in which q=1 to 5 and $R^6$ and $R^7$ independently of one another is a $C_1$–$C_{30}$ alkyl radical, and p=0 or 1.

Particularly preferred triorganoamines of type ii) correspond to the general formula (III) with x=2 and $R^8$=$C_3$–$C_{18}$ alkyl, $C_5$–$C_6$ cycloalkyl or —(N(CH$_3$))$_p$(CH$_2$)$_q$N(CH$_3$)$_2$, in which q=2 or 3 and p=0 or 1.

Especially preferred compounds of type ii) used are N,N-dimethyldodecylamine, N,N-dimethylundecylamine, N,N,N',N'-tetramethylethylenediamine, N,N,N',N'-tetramethylhexamethylenediamine, N,N,N',N',N''-pentamethyldiethylenetriamine or N,N-dimethylcyclohexylamine and also mixtures thereof.

In one preferred embodiment of the invention compounds of the type ii) described in detail above are used exclusively as compounds of component d).

The invention additionally provides the phenolically blocked polyurethane prepolymers prepared by the process of the invention.

For the preparation of the prepolymers of the invention, suitable compounds of component a) include in principle all aliphatic, cycloaliphatic, aromatic or heterocyclic organic diisocyanates and polyisocyanates having at least two isocyanate groups and also mixtures thereof. By way of example mention may be made of aliphatic diisocyanates or triisocyanates such as, for example, butane diisocyanate, pentane diisocyanate, hexane diisocyanate (hexamethylene diisocyanate, HDI), 4-isocyanatomethyl-1,8-octane diisocyanate (triisocyanatononane, TIN) or cyclic systems, such as 4,4'-methylenebis(cyclohexyl isocyanate) (Desmodur®W, Bayer AG, Leverkusen), 3,5,5-trimethyl-1-isocyanato-3-isocyanatomethylcyclohexane (isophorone diisocyanate, IPDI) and also ω,ω'-diisocyanato-1,3-dimethylcyclohexane (H$_6$XDI) or aromatic polyisocyanates such as 1,5-naphthalene diisocyanate, diisocyanatodiphenylmethane (MDI) or crude MDI, diisocyanatomethylbenzene (2,4- and 2,6-tolylene diisocyanate, TDI), especially the 2,4- and the 2,6 isomer and technical-grade mixtures of both isomers, and also 1,3-bis(isocyanatomethyl)benzenel (XDI).

Preferred compounds of component a) are aromatic polyisocyanates such as 1,5-naphthalene diisocyanate, diisocyanatodiphenylmethane (MDI) or crude MDI, diisocyanatomethylbenzene (2,4- and 2,6-tolylene diisocyanate, TDI), especially the 2,4- and the 2,6 isomers and technical-grade mixtures of both isomers, and also 1,3-bis(isocyanatomethyl)benzene (XDI).

Very particular suitability is possessed by 2,4-tolylene diisocyanate and also its technical-grade mixture composed of from 70 to 90% 2,4-tolylene diisocyanate and from 30 to 10% 2,6-tolylene diisocyanate.

Likewise suitable for the purposes of the invention are the downstream products, known per se, of each of the isocyanates mentioned above, which have a biuret, isocyanurate, iminooxadiazinedione, uretione, allophanate and/or urethane structure.

As the isocyanate-reactive compound of component b) it is possible with preference to use all of the polyhydroxy compounds known to the person skilled in the art which have an OH functionality >1.5, such as low molecular mass diols (e.g. 1,2-ethanediol, 1,3 and 1,2-propanediol, 1,4-butanediol), triols (e.g. glycerol, trimethylolpropane) and tetraols (e.g. pentaerythritol), polyetherpolyols, polyesterpolyols, polycarbonatepolyols and polythioetherpolyols, for example. Preferred polyhydroxy compounds of the above-mentioned type are polyether-based substances.

Particularly preferred polyhydroxy compounds of the type mentioned above are polyetherpolyols with an OH functionality >1.9, preferably >1.95, and a molecular weight range from 300 to 20 000, preferably from 1000 to 12 000, more preferably from 2000 to 6000, which are obtainable in conventional manner by alkoxylation of suitable starter molecules.

Especially preferred polyhydroxy compounds are polyetherpolyols of the aforementioned type containing less than or equal to 0.02 milliequivalents of unsaturated end groups per gram of polyol, preferably less than or equal to 0.015 milliequivalents per gram of polyol, more preferably less than or equal to 0.01 milliequivalents per gram of polyol (method of determination: ASTM D2849-69) and having a molecular weight distribution (polydispersity; $PD=M_w/M_n$) of from 1.1 to 1.5. They can be prepared in conventional manner, for example in accordance with U.S. Pat. No. 5,158,922 (e.g. example 30) or EP-A 0 654 302 (p. 5, line 26 to p. 6, line 32) by alkoxylation of suitable starter molecules, especially using double metal cyanide catalysts (DMC catalysis).

Table 1 lists examples of some polyetherpolyols of the especially preferred type:

such polyols with dicarboxylic acids of the type exemplified below or low molecular mass ethoxylation or propoxylation products of simple polyols or any desired mixtures of such modified or unmodified alcohols.

The hydrocarbon resins containing phenolic OH groups that are used in component c) are known in principle and described by way of example in Ullmanns Encyklopaidie der technischen Chemie, 4th Edition, Volume 12, pp. 539 to 545, (Verlag Chemie, Weinheim 1976), Kirk-Othmer, Encyclopedia of Chemical Technology, 3rd Edition, Volume 12, pp. 852 to 869, (John Wiley & Sons, New York 1980) or Encyclopedia of Polymer Science and Engineering, Vol. 7, pp. 758 to 782, (John Wiley & Sons, New York 1987). Examples of suitable hydrocarbon resins c) containing phenolic OH groups are coumarone-indene resins, petroleum resins or terpene resins.

Hydrocarbon resins of this kind containing phenolic OH groups are typically prepared by copolymerizing unsaturated hydrocarbons of the type specified below with phenol and/or alkylated phenols such as cresols in the presence of strong acids or catalysts of the Friedel-Crafts type. Suitable unsaturated hydrocarbons for preparing the OH-functional hydrocarbon resins which can be used in accordance with the invention are the hydrocarbons obtained in the cracking of naphtha or gas oil, such as butene, butadiene, pentene, piperylene, isoprene, cyclopentadiene, styrene, α-methylstyrene, vinyltoluene, dicyclopentadiene, methyldicyclopentadiene, indene or methylindene, for example. Further suitable unsaturated hydrocarbons include terpene resins, such as α-pinene, β-pinene, dipentene, D-limonene or turpentine.

The suitable hydrocarbon resins have a hydroxyl content of from 0.1 to 10.0% by weight. Particular preference is given to using hydrocarbon resins which are liquid at room

TABLE 1

| | Acclaim ® 1000 | Acclaim ® 2200 | Acclaim ® 3201 | Acclaim ® 4200 | Acclaim ® 6300 | Acclaim ® 8200 | Acclaim ® 12200 |
|---|---|---|---|---|---|---|---|
| Physical data | | | | | | | |
| Molecular weight | 1000 | 2000 | 3000 | 4000 | 6000 | 8000 | 12000 |
| Functionality | 2 | 2 | 2 | 2 | 3 | 2 | 2 |
| Viscosity(25° C.) | 70 | 335 | 620 | 980 | 1470 | 3000 | 5950 |
| Chemical data | | | | | | | |
| OH number (mg KOH/g) | 112 | 56 | 37 | 28 | 28 | 14 | 10 |
| Double bond content (meq/g) | ≦0.0070 | ≦0.0070 | ≦0.0070 | ≦0.0070 | ≦0.0070 | ≦0.0070 | ≦0.0070 |
| Acid number (mg KOH/g) | 0.02 | 0.02 | 0.018 | 0.018 | 0.02 | 0.02 | 0.02 |

All Acclaim ® products are available from Bayer AG, Leverkusen, Germany.

Examples of suitable starter molecules for preparing the aforementioned polyetherpolyols are simple polyols of low molecular mass, water, organic polyamines having at least two N—H bonds or any desired mixtures of such starter molecules. Alkylene oxides suitable for the alkoxylation of, in particular, ethylene oxide and/or propylene oxide, which can be used in either order or else in a mixture in the alkoxylation.

Preferred starter molecules for preparing the polyetherpolyols by alkoxylation, especially by the DMC process, are polyols such as ethylene glycol, 1,3-propylene glycol and butane-1,4-diol, hexane-1,6-diol, neopentyl glycol, 2-ethylhexane-1,3-diol, glycerol, triethylolpropane, pentaerythritol and also low molecular mass, hydroxyl-containing esters of temperature and have a hydroxyl content of from 2 to 8% by weight, very preferably from 3 to 5% by weight.

Examples of suitable HC resins are available commercially under the trade name Novares® from Rutgers, Duisburg, Germany or Nevoxy® from Neville Chemical Europe Polymers BV, Uithoom, The Netherlands.

Suitable optionally substituted phenols of component c) are, in particular, $C_1$–$C_{18}$-alkylphenols, especially $C_6$–$C_{12}$-alkylphenols, in which the alkyl radical can be linear, branched or else cyclic. Isomer mixtures of different alkylphenols can of course also be used. Examples are phenol, cresol and its isomers, xylenol and its isomers, 2-tert-butylphenol, 4-tert-butylphenol, nonylphenol and its optionally branched isomers (technical-grade isononylphenol).

Further examples of substituted phenols are alkyl hydroxybenzoates in which the ester group is preferably a $C_1$ to $C_4$ alkyl radical. Mixtures of the said alkylphenols and alkyl hydroxybenzoates can of course also be used.

As blocking agents containing phenol groups, as component c), it is preferred, however, to use exclusively hydrocarbon resins.

The polyurethane prepolymers containing isocyanate groups are prepared by reacting the isocyanate-reactive compounds b) with excess amounts of the diisocyanates or polyisocyanates a) or else with a large excess of the said diisocyanates or polyisocyanates and subsequently removing the excess polyisocyanate, by thin-film distillation, for example. The molar ratio of the isocyanate-reactive groups of component b) to the NCO groups of the diisocyanate or polyisocyanate a) is preferably between 1:1.5 and 1:20, more preferably between 1:1.8 and 1:5 and very preferably between 1:1.95 and 1:2.05. The polyurethane prepolymers are generally prepared at from 20 to 140° C., preferably from 40 to 100° C.

The preparation of the phenolically blocked polyurethane prepolymers of the invention is accomplished subsequently by reacting the polyurethane prepolymers containing isocyanate groups with the hydrocarbon resins containing phenolic OH groups and/or the optionally substituted phenols c) at temperatures from 40° C. to 150° C., preferably from 50° C. to 100° C., more preferably from 60 to 90° C., in the presence of the triorganoamine catalysts d).

The amount of component c) used in the blocking reaction ought to correspond to at least 30 mol %, preferably 50 mol %, more preferably more than 95 mol % of the amount of isocyanate groups to be blocked. A small excess of blocking agent may be advantageous in order to ensure complete reaction of all isocyanate groups. In general the excess does not amount to more than 20 mol %, preferably not more than 15 mol % and more preferably not more than 10 mol %, based on the isocyanate groups to be blocked. With very particular preference the amount of component c) used in the blocking reaction is therefore from 95 mol % to 110 mol %, based on the amount of isocyanate groups that are to be blocked in the polyurethane prepolymer.

The blocking reaction can optionally be conducted in the presence of inert solvents, or paint solvents, such as, for example, ethyl acetate, butyl acetate, methoxypropyl acetate, methyl ethyl ketone, methyl isobutyl ketone, toluene, xylene, aromatic or (cyclo-)aliphatic hydrocarbon mixtures or any desired mixtures of such solvents. These solvents or paint solvents must then be separated off again by distillation, for example, following the synthesis in order to give solvent-free reactive systems.

The reactions according to the invention, however, are preferably conducted solventlessly.

In one preferred embodiment the diisocyanate or polyisocyanate a) is charged to a suitable reaction vessel and is heated, optionally with stirring, to from 40 to 150° C., preferably to from 60 to 120° C. and more preferably to from 60 to 100° C. After the desired temperature has been reached the isocyanate-reactive component b) is then added with stirring and the mixture is stirred until the theoretical NCO content of the polyurethane prepolymer to be expected in accordance with the chosen stoichiometry, or a slightly lower NCO content, has been reached. This is followed by the addition of the blocking agent c) and of the triorganoamine catalyst d)—the order is immaterial—at a temperature within the ranges specified above for the formation of the prepolymer. Following the addition of components c) and d) the reaction mixture is heated until the free isocyanate group content is less than 0.5% by weight, preferably less than 0.2% by weight, more preferably less than 0.1% by weight. Thereafter the reaction mixture is cooled and optionally provided also with a reaction stopper, such as benzoyl chloride, for example, in order to deactivate the catalyst.

In another preferred embodiment the procedure is as described above with the modification that, for the formation of the prepolymer, component b) is introduced as the initial charge and a) is added.

The phenolically blocked polyurethane prepolymers prepared in accordance with the invention feature a particularly low viscosity as compared with analogous polymers prepared using non-amine-type catalysts. They can therefore be used, for example, to particularly good effect in low-solvent or solvent-free reactive systems, since owing to their viscosity they give these systems particularly advantageous processing properties, such as good fluidity or levelling properties, for example, thereby allowing particularly high-grade and uniform coatings or adhesive bonds to be obtained.

Consequently, the invention further provides reactive systems of particularly low viscosity and their preparation.

The reactive systems of the invention comprise

A) one or more blocked polyurethane prepolymers of the inventive kind,

B) one or more organic amines having at least two primary amino groups,

C) optionally compounds containing oxirane groups which contain on average more than one oxirane group per molecule, D) optionally catalysts and/or additives and E) optionally compounds through reaction of one or more of components A)–D) with one another.

Suitable compounds of component B) of the reactive system of the invention include polyamines which contain at least two primary amino groups per molecule and optionally also secondary amino groups and which preferably have an average molecular weight of from 60 to 500. Those suitable include, for example, ethylenediamine, 1,2- and 1,3-diaminopropane, 1,4-diaminobutane, 2,2,4- and/or 2,4,4-trimethylhexamethylenediamine, the isomeric xylylenediamines, 1,2- and 1,4-diaminocyclohexane, 4,4'-diaminodicyclohexylmethane, 1,3-diaminocyclopentane, 4,4'-diaminodicyclohexyl sulfone, 1,3-bis(4-aminocyclohexyl)propane, 2,2-bis(4-aminocyclohexyl)propane, 3,3'-dimethyl-4,4'-diaminodicyclohexylmethane, 3-aminomethyl-3,5,5-trimethylcyclohexylamine (isophoronediamine), 3(4)-aminomethyl-1-methylcyclohexylamine or technical-grade bisaminomethyltricyclodecane or else those polyamines which in addition to at least two primary amino groups also contain secondary amino groups, such as diethylenetriamine or triethylenetetraamine, for example.

Preference is given to using the polyamines, especially diamines of the stated molecular weight range, which contain one or more cycloaliphatic rings. These include, for example, 1,2- and 1,4-diaminocyclohexane, 4,4'-diaminodicyclo-hexylmethane, 1,3-diaminocyclopentane, 4,4'-diaminodicyclohexyl sulfone, 1,3-bis(4-aminocyclohexyl)propane, 2,2-bis(4-aminocyclohexyl)propane, 3,3'-dimethyl-4,4'-diaminodicyclohexylmethane, 3-aminomethyl-3,3,5-trimethylcyclohexylamine (isophoronediamine), 3(4)-aminomethyl-1-methylcyclo hexylamine or technical-grade bisaminomethyltricyclodecane.

Likewise possible for use as compounds of component B) are adducts prepared by reacting an excess of the stated polyamines with epoxy resins of the type specified below.

Additionally possible for use in component B) are polyetheramines which are prepared by reacting polyetherpolyols with ammonia and are sold, for example, by Huntsman, USA under the trade name "Jeffamin®".

Additionally suitable, moreover, as constituents of component B) are polyamide resins. Polyamide resins of this kind, which include the polyaminoamides and the polyaminoimidazolines, are sold, for example, by Henkel KGA, Duisseldorf, DE under the trade name "Versamid®".

It is of course also possible to use mixtures of the stated polyamines as component B).

As compounds of component C) it is possible to use all compounds containing oxirane groups, such as epoxy resins, for example, which contain on average more than one epoxide group per molecule. Examples of those suitable include glycidyl ethers of polyhydric alcohols such as butanediol, hexanediol, glycerol, hydrogenated diphenylolpropane or polyhydric phenols such as resorcinol, 2,2-diphenylolpropane (bisphenol A) diphenylolmethane (bisphenol F) or phenolaldehyde condensates. It is also possible to use glycidyl esters of polybasic carboxylic acids, such as hexahydrophthalic acid or dimerized fatty acid.

Preference is given to using liquid epoxy resins based on epichlorohydrin and 2,2-diphenylolpropane (bisphenol A) or diphenylolmethane (bisphenol F) or mixtures thereof. A possible option is to lower the viscosity of the mixtures using monofunctional epoxide compounds and so to improve processing. Examples thereof are aliphatic and aromatic glycidyl ethers such as butyl glycidyl ether, phenyl glycidyl ether or glycidyl esters such as Versatic acid glycidyl esters or epoxides such as styrene oxide or 1,2-epoxydodecane.

In the reactive systems of the invention there are generally from 0.4 to 0.9, preferably from 0.5 to 0.8 primary amino groups of component B) and from 0.02 to 0.6, preferably from 0.03 to 0.5 blocked isocyanate groups of component A) per epoxide group of component C).

In order to prepare ready-to-use mixtures it is possible to admix to the reactive systems, in component D), and in addition to A), B) and optionally C), the customary auxiliaries and additives, such as, for example, fillers, solvents, levelling assistants, pigments, solvents, reaction accelerants or viscosity regulators. Examples that may be mentioned include reaction accelerants such as salicylic acid, bis(dimethylaminomethyl)phenol or tris(dimethylaminomethyl)phenol, fillers such as sand, rock flour, silica, ground asbestos, kaolin, talc, metal powders, tar, pitch, asphalts, cork chips, polyamides, plasticizers such as phthalates, for example, or other viscosity regulators such as benzyl alcohol, for example.

It is of course also possible to add to the ready-to-use mixture, optionally, up to 20% by weight, preferably up to 10% by weight, more preferably up to 5% by weight of a solvent or paint solvent of the type already described above for technical purposes associated with application. If solvents are to be used at this point, it is also possible to forego the removal of the solvent in the case that solvents are employed during the preparation of the PU prepolymers of the invention. Preference is given, however, to solvent-free ready-to-use mixtures.

Furthermore, the blocked polyurethane prepolymers for use in accordance with the invention exhibit an outstanding compatibility with components B) and C), since the reaction of epoxy resin/amine and blocked isocyanate/amine can be adjusted in such a way that the reactive systems give rise to a compatible blend at room temperature.

The invention further provides for the use of the reactive systems of the invention for producing coatings, adhesives, sealants, jointing compounds or mouldings in all fields of application where good adhesion, chemical resistance, and also high impact strength, in conjunction with good flexibility and elasticity, are required. The systems of the invention are especially suitable as corrosion protection coatings. Especially in the case of loading with aggressive media, such as in the case of ballast tank coating, for example, the systems are notable for good wet adhesion and good adhesion under cathodic protection conditions.

The reactive systems of the invention can be used on any of a very wide variety of substrates. Examples that may be mentioned include mineral substrates, of concrete and/or stone, for example, metallic substrates, of iron, steel, copper, brass, bronze, aluminium or titanium, for example, and also of alloys of the stated metals, and plastics, in the form for example of existing coatings on, for example, the metallic or mineral substrates referred to.

The reactive systems of the invention can be applied to the surface to be coated by methods which include, for example, pouring, brushing, dipping, spraying, flowcoating, knife-coating or rolling. In accordance with the field of application it is thereby possible to achieve coat thicknesses of 10 μm (e.g. for thin corrosion protection coatings) up to several centimetres (e.g. for crack-bridging jointing compounds).

Depending on the chosen composition of the reactive systems of the invention they cure under ambient conditions, i.e. at temperatures of preferably from −30° C. to 50° C. and a relative humidity of preferably from 10% to 90%, within a few minutes to several days. By means of increased temperatures, i.e. above the stated 50° C., it is also possible to force the curing process, which may likewise be desired in practice.

EXAMPLES

Prefatory Note:

The free isocyanate group content (NCO content) was determined by adding a defined amount of a di-n-butylamine solution (1 mol/liter in chlorobenzene) to the sample under analysis in solution in chlorobenzene/ethanol (approximately 1:3 parts by volume) and titrating with 1 N hydrochloric acid. The blocked isocyanate group content (blocked NCO content) was calculated from the NCO content of the isocyanate-functional polyurethane prepolymer.

The polyetherpolyols used in the examples to prepare the blocked polyurethane prepolymers of the invention are available from Bayer AG, Leverkusen, Germany, and are characterized by the following key data:

TABLE 2

|  | Acclaim ® 1000 | Acclaim ® 2200 | Acclaim ® 3201 | Acclaim ® 4200 |
| --- | --- | --- | --- | --- |
| Physical data |  |  |  |  |
| Molecular weight | 1000 | 2000 | 3000 | 4000 |
| OH functionality | 2 | 2 | 2 | 2 |
| Viscosity (25° C.) | 70 | 335 | 620 | 980 |
| Chemical data |  |  |  |  |
| OH number (mg KOH/g) | 112 | 56 | 37 | 28 |

TABLE 2-continued

|  | Acclaim® 1000 | Acclaim® 2200 | Acclaim® 3201 | Acclaim® 4200 |
|---|---|---|---|---|
| Unsaturated end group content (meq/g) | ≦0.0070 | ≦0.0070 | ≦0.0070 | ≦0.0070 |
| Acid number (mg KOH/g) | 0.02 | 0.02 | 0.018 | 0.018 |

Materials employed:

| Trade name | Chem. designation | Manufacturer |
|---|---|---|
| Novares® LX 200 | Phenolically modified liquid hydrocarbon resin, copolymer of unsaturated aromatic $C_9$-/$C_{10}$ hydrocarbons; OH content: 4% by weight | VFT AG, Duisburg, DE |
| D.E.R 358 | Liquid epoxy resin based on bisphenol A and bisphenol F; epoxide content: 24.6% by weight | Dow Plastics, Midland, USA |
| Perenol® E 8 | Additive for devolatilizing and defoaming | Cognis Deutschland GmbH&Co. KG, Düsseldorf, DE |
| Laromin® C 260 | Bis(4-amino-3-methylcyclohexyl)methane | BASF AG, Ludwigshafen, DE |

Comparative Example 1 a) Preparation of a Blocked Polyurethane Prepolymer:

41.5 g of a mixture of 2,4-diisocyanatotoluene and 2,6-diisocyanatotoluene (80:20 parts by weight) were charged to a flask having an internal thermometer, mechanical stirrer, dropping funnel and reflux condenser at 80° C. Then, over the course of 5 hours with stirring, 238.8 g of the polyetherpolyol Acclaim® 2200 with an OH number of 56 were added. The reaction mixture was then prepolymerized with stirring at 80° C. until the theoretical NCO content of 3.58% by weight was reached. Subsequently, at a temperature of from 65 to 75° C., 119.7 g of a commercial hydrocarbon resin having a hydroxyl group content of 4% by weight (Novares® LX 200) were added with stirring and the reaction mixture was catalysed with 0.03 g of dibutyltin(II) dilaurate. The reaction mixture was then heated at 80° C. with stirring until an NCO content (titration) of 0.2% by weight was reached. Finally 0.06 g of benzoyl chloride were added and the product was cooled to room temperature. The blocked polyurethane prepolymer obtained gave the following key data:

| blocked NCO content: | 2.44% by weight |
|---|---|
| viscosity (23° C.): | 86 000 mPas | b) Preparation of a Reactive System.

20 g of the blocked polyurethane prepolymer prepared according to example 2 were mixed with 20 g of DER® 358, 0.4 g of oleic acid, 0.2 g of Perenol® E 8, 0.2 g of 2,3-dimethyl-3,4,5,6-tetrahydropyrimidine and 6.75 g of octahydro-4,7-methanoindene-1(2),5(6)dimethanamine and 0.2 g of benzyl alcohol and cured at room temperature for one day. This gave a homogeneous, elastic polymer having the following key mechanical data:

| Breaking stress: | 21.4 MPa |
|---|---|
| Breaking elongation: | 38.9% |
| Tear propagation resistance: | 39.1 N/mm |

Comparative Example 2

35.6 g of a mixture of 2,4-diisocyanatotoluene and 2,6-diisocyanatotoluene (80:20 parts by weight) were charged to a flask having an internal thermometer, mechanical stirrer, dropping funnel and reflux condenser at 80° C. Then, over the course of 5 hours with stirring, a mixture of 261.0 g of a polyetherpolyol with an OH number of 44 prepared by simultaneous, base-catalysed ethoxylation and propoxylation (EO/PO ratio=2:8) of a 2:1 mixture of propylene glycol and glycerol, and 0.02 g of 3-chloropropionic acid were added. The reaction mixture was then prepolymerized with stirring at 80° C. until the theoretical NCO content of 2.90% by weight was reached. Subsequently, at a temperature of from 65 to 75° C., 102.6 g of a commercial hydrocarbon resin having a hydroxyl group content of 4% by weight (Novares® LX 200) were added with stirring and the reaction mixture was catalysed with 0.24 g of dibutyltin(II) dilaurate. The reaction mixture was then heated at 80° C. with stirring until an NCO content (titration) of 0.2% by weight was reached. Finally 0.47 g of benzoyl chloride were added and the product was cooled to room temperature. The blocked polyurethane prepolymer obtained gave the following key data:

| blocked NCO content: | 2.22% by weight |
|---|---|
| viscosity (23° C.): | 150 000 mPas |

Comparative Example 3

In analogy to the process described in comparative example 1, a polyurethane prepolymer having a theoretical NCO content of 1.93% by weight was prepared from 26.0 g of a mixture of 2,4-diisocyanatotoluene and 2,6-diisocyanatotoluene (80:20 parts by weight) and 298.4 g of the polyetherpolyol Acclaim® 4200 (OH number 28) and was blocked with 74.8 g of a commercial hydrocarbon resin having a hydroxyl group content of 4% by weight (Novares® LX 200) in the presence of 0.28 g of dibutyltin(II) dilaurate. After stopping with 0.56 g of benzoyl chloride, a blocked polyurethane prepolymer was obtained which had the following keydata:

| blocked NCO content: | 1.57% by weight |
|---|---|
| viscosity (23° C.): | 63 000 mPas |

Comparative Example 4

In analogy to the process described in comparative example 1, a polyurethane prepolymer having a theoretical NCO content of 2.51% by weight was prepared from 31.9 g of a mixture of 2,4-diisocyanatotoluene and 2,6-diisocyanatotoluene (80:20 parts by weight) and 275.3 g of the polyetherpolyol Acclaim® 3201 (OH number 37) and was blocked with 92.0 g of a commercial hydrocarbon resin having a hydroxyl group content of 4% by weight (Novares® LX 200) in the presence of 0.28 g of dibutyltin(II) dilaurate. After stopping with 0.56 g of benzoyl chloride, a blocked polyurethane prepolymer was obtained which had the following key data:

| | |
|---|---|
| blocked NCO content: | 1.88% by weight |
| viscosity (23° C.): | 52 000 mPas |

Comparative Example 5

In analogy to the process described in comparative example 2, an isocyanate-functional prepolymer having a (theoretical) NCO content of 2.90% by weight was prepared from 41.4 g of 2,4-diisocyanatotoluene and 303.4 g of the polyether described in comparative example 2, with the addition of 10 mg of 3-chloropropionic acid, and finally was blocked with 55.1 g of nonylphenol in the presence of 30 mg of dibutyltin(II) dilaurate and stopped with 60 mg of benzoyl chloride. The key data of the blocked polyurethane prepolymer were as follows:

| | |
|---|---|
| blocked NCO content: | 2.53% by weight |
| Viscosity (23° C.): | 119 000 mPas |

Comparative Example 6

In analogy to the process described in comparative example 1, a polyurethane prepolymer having a (theoretical) NCO content of 3.58% by weight was prepared from 31.2 g of a mixture of 2,4-diisocyanatotoluene and 2,6-diisocyanatotoluene (80:20 parts by weight) and 179.1 g of the polyetherpolyol Acclaim® 2200 (OH number 56) and was blocked with 89.8 g of a commercial hydrocarbon resin having a hydroxyl group content of 4% by weight (Novares® LX 200) in the presence of 20 mg of 1,4-diazabicyclo[2.2.2]octane (DABCO). After stopping with 50 mg of benzoyl chloride, a blocked polyurethane prepolymer was obtained which after 7 days of storage at 50° C. showed a marked clouding and had therefore become unusable for further processing.

Comparative Example 7

In analogy to the process described in comparative example 1, a polyurethane prepolymer having a theoretical NCO content of 3.58% by weight was prepared from 41.5 g of a mixture of 2,4-diisocyanatotoluene and 2,6-diisocyanatotoluene (80:20 parts by weight) and 238.7 g of the polyetherpolyol Acclaim® 2200 (OH number 56) and was blocked with 119.7 g of a commercial hydrocarbon resin having a hydroxyl group content of 4% by weight (Novares® LX 200) in the presence of 0.07 g of 1,8-diazabicyclo[5.4.0]undec-7-ene. After stopping with 0.07 g of benzoyl chloride, a blocked polyurethane prepolymer was obtained which had the following key data:

| | |
|---|---|
| blocked NCO content: | 2.52% by weight |
| viscosity (23° C.): | 98 000 mPas |

In the light of comparative example 1 (tin-containing catalyst) the use of this amine catalyst does not achieve any significant reduction in viscosity.

Comparative Example 8

In analogy to the process described in comparative example 7, a blocked polyurethane prepolymer having the key data below was prepared, but 0.06 g of 1,5-diazabicyclo[4.3.0]non-5-ene was used as catalyst and the reaction was stopped with 0.06 g of benzoyl chloride:

| | |
|---|---|
| blocked NCO content: | 2.53% by weight |
| viscosity (23° C.): | 83 000 mPas |

In the light of comparative example 1 (tin-containing catalyst) the use of this amine catalyst does not achieve any significant reduction in viscosity.

Example 1 a) Preparation of a Blocked Polyurethane Prepolymer.

41.5 g of a mixture of 2,4-diisocyanatotoluene and 2,6-diisocyanatotoluene (80:20 parts by weight) were charged to a flask having an internal thermometer, mechanical stirrer, dropping funnel and reflux condenser at 80° C. Then, over the course of 5 hours with stirring, 238.8 g of the polyetherpolyol Acclaim® 2200 with an OH number of 56 were added. The reaction mixture was then prepolymerized with stirring at 80° C. until the theoretical NCO content of 3.58% by weight was reached. Subsequently, at a temperature of from 65 to 75° C., 119.7 g of a commercial hydrocarbon resin having a hydroxyl group content of 4% by weight (Novares® LX 200) were added with stirring and the reaction mixture was catalysed with 0.10 g of N,N-dimethyldodecylamine. The reaction mixture was then heated at 80° C. with stirring until an NCO content (titration) of 0.2% by weight was reached. Finally 0.10 g of benzoyl chloride were added and the product was cooled to room temperature. The blocked polyurethane prepolymer obtained gave the following key data:

| | |
|---|---|
| blocked NCO content: | 2.42% by weight |
| viscosity (23° C.): | 57 000 mPas |

As apparent from the key data of the polyurethane prepolymer described in example 1a), the use of the triorganoamine catalyst N,N-dimethyldodecylamine gave a product of much lower viscosity than when dibutyltin dilaurate was used (comparative example 1).

b) Preparation of a Reactive System:

20 g of the blocked polyurethane prepolymer prepared according to example 2 were mixed with 20 g of DER® 358, 0.4 g of oleic acid, 0.2 g of Perenol® E 8, 0.2 g of 2,3-dimethyl-3,4,5,6-tetrahydropyrimidine and 6.77 g of octahydro-4,7-methanoindene-1(2),5(6)dimethanamine and 0.2 g of benzyl alcohol and cured at room temperature for one day. This gave a homogeneous, elastic polymer having the following key mechanical data:

| | |
|---|---|
| Breaking stress: | 21.3 MPa |
| Breaking elongation: | 49.6% |
| Tear propagation resistance: | 34.4 N/mm |

As apparent from the key mechanical data of the elasticized amine-epoxy polymer described in example 1b), the mechanical properties achieved through the use of the polyurethane prepolymers prepared in accordance with the invention were even better (example 2) than when a prepolymer prepared in accordance with the prior art, using tin-containing catalysts (comparative example 1), was used.

Example 2

35.6 g of a mixture of 2,4-diisocyanatotoluene and 2,6-diisocyanatotoluene (80:20 parts by weight) were charged to a flask having an internal thermometer, mechanical stirrer, dropping funnel and reflux condenser at 80° C. Then, over the course of 5 hours with stirring, a mixture of 261.0 g of a polyetherpolyol with an OH number of 44 prepared by simultaneous, base-catalysed ethoxylation and propoxylation (EO/PO ratio=2:8) of a 2:1 mixture of propylene glycol and glycerol, and 0.02 g of 3-chloropropionic acid were added. The reaction mixture was then prepolymerized with stirring at 80° C. until the theoretical NCO content of 2.90% by weight was reached. Subsequently, at a temperature of from 65 to 75° C., 102.6 g of a commercial hydrocarbon resin having a hydroxyl group content of 4% by weight (Novares® LX 200) were added with stirring and the reaction mixture was catalysed with 0.08 g of N,N-dimethyldodecylamine. The reaction mixture was then heated at 80° C. with stirring until an NCO content (titration) of 0.2% by weight was reached. Finally 0.08 g of benzoyl chloride were added and the product was cooled to room temperature. The blocked polyurethane prepolymer obtained gave the following key data:

| | |
|---|---|
| blocked NCO content: | 2.22% by weight |
| viscosity (23° C.): | 51 000 mPas |

The viscosity lies well below that of the corresponding blocked polyurethane prepolymer prepared according to comparative example 2.

Example 3

In analogy to the process described in example 1, a polyurethane prepolymer having a (theoretical) NCO content of 1.93% by weight was prepared from 26.0 g of a mixture of 2,4-diisocyanatotoluene and 2,6-diisocyanatotoluene (80:20 parts by weight) and 298.9 g of the polyetherpolyol Acclaim® 4200 (OH number 28) and was blocked with 74.9 g of a commercial hydrocarbon resin having a hydroxyl group content of 4% by weight (Novares® LX 200) in the presence of 0.10 g of N,N-dimethyldodecylamine. After stopping with 0.10 g of benzoyl chloride, a blocked polyurethane prepolymer was obtained which had the following key data:

| | |
|---|---|
| blocked NCO content: | 1.57% by weight |
| viscosity (23° C.): | 23 000 mPas |

The viscosity lies well below that of the corresponding blocked polyurethane prepolymer prepared according to comparative example 3.

Example 4

In analogy to the process described in example 1, a polyurethane prepolymer having a theoretical NCO content of 2.51% by weight was prepared from 32.0 g of a mixture of 2,4-diisocyanatotoluene and 2,6-diisocyanatotoluene (80:20 parts by weight) and 275.7 g of the polyetherpolyol Acclaim® 3201 (OH number 37) and was blocked with 92.1 g of a commercial hydrocarbon resin having a hydroxyl group content of 4% by weight (Novares® LX 200) in the presence of 0.10 g of N,N-dimethyldodecylamine. After stopping with 0.10 g of benzoyl chloride, a blocked polyurethane prepolymer was obtained which had the following key data:

| | |
|---|---|
| blocked NCO content: | 2.01% by weight |
| viscosity (23° C.): | 27 000 mPas |

The viscosity lies well below that of the corresponding blocked polyurethane prepolymer prepared according to comparative example 4.

Example 5

In analogy to the process described in example 2, an isocyanate-functional prepolymer having a (theoretical) NCO content of 2.90% by weight was prepared from 41.4 g of 2,4-diisocyanatotoluene and 303.4 g of the polyether described in example 2, with the addition of 10 mg of 3-chloropropionic acid, and finally was blocked with 55.1 g of nonylphenol in the presence of 10 mg of N,N-dimethyldodecylamine and stopped with 10 mg of benzoyl chloride. The key data of the blocked polyurethane prepolymer were as follows:

| | |
|---|---|
| blocked NCO content: | 2.46% by weight |
| viscosity (23° C.): | 75 000 mPas |

The viscosity lies well below that of the corresponding blocked polyurethane prepolymer prepared according to comparative example 5.

Example 6

In analogy to the process described in example 1, a blocked polyurethane prepolymer with the key data below was obtained from 155.8 g of a mixture of 2,4-diisocyanatotoluene and 2,6-diisocyanatotoluene (80:20 parts by weight), 895.4 g of Acclaim® 2200 and 448.9 g of Novares® LX 200, using 0.11 g of N,N-dimethylundecylamine and stopping with 0.22 g of benzoyl chloride:

| blocked NCO content: | 2.58% by weight |
|---|---|
| viscosity (23° C.): | 65 000 mPas |

The viscosity lies well below that of the corresponding blocked polyurethane prepolymer prepared according to comparative example 1.

Example 7

In analogy to the process described in example 1, a blocked polyurethane prepolymer with the key data below was obtained from 25.8 g of a mixture of 2,4-diisocyanatotoluene and 2,6-diisocyanatotoluene (80:20 parts by weight), 148.1 g of Acclaim® 2200 and 76.0 g of Novares® LX 200, using 0.06 g of N,N-dimethylundecylamine and stopping with 0.06 g of benzoyl chloride:

| blocked NCO content: | 2.57% by weight |
|---|---|
| viscosity (23° C.): | 57 000 mPas |

Example 8

In analogy to the process described in example 1, a polyurethane prepolymer having a theoretical NCO content of 6.23% by weight was prepared from 59.2 g of a mixture of 2,4-diisocyanatotoluene and 2,6-diisocyanatotoluene (80:20 parts by weight) and 170.1 g of the polyetherpolyol Acclaim® 1000 (OH number 112) and was blocked with 170.5 g of a commercial hydrocarbon resin having a hydroxyl group content of 4% by weight (Novares® LX 200) in the presence of 0.14 g of N,N-dimethyldodecylamine. After stopping with 0.14 g of benzoyl chloride, a blocked polyurethane prepolymer was obtained which had the following key data:

| blocked NCO content: | 3.60% by weight |
|---|---|
| viscosity (23° C.): | 303 000 mPas |

Examples 9 to 14

In analogy to the process described in example 1, further blocked polyurethane prepolymers were prepared with different triorganoamine catalysts. The nature and the amount of the triorganoamine catalyst used and also the key data of the blocked polyurethane prepolymer obtained are summarized in table 3 below (the amount of the benzoyl chloride stopper added corresponded in every case to the amount of triorganoamine catalyst used).

TABLE 3

| Example | Triorganoamine catalyst | Amount of catalyst [g] | Blocked NCO content [% by wt.] | Viscosity [mPas] |
|---|---|---|---|---|
| 9 | N,N,N',N'-Tetramethylethylenediamine | 0.17 | 2.49 | 63 000 |
| 10 | N,N-Dimethylaminocyclohexylamine | 0.06 | 2.59 | 59 000 |
| 11 | N,N,N',N'-Tetramethylhexamethylenediamine | 0.04 | 2.59 | 59 000 |
| 12 | N,N,N',N',N''-Pentamethyldiethylenetriamine | 0.03 | 2.46 | 64 000 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing phenolically blocked polyurethane prepolymers, comprising reacting
   a) one or more diisocyanates or polyisocyanates with
   b) at least one isocyanate-reactive compound with a functionality of at least 1.5 to form an NCO-functional polyurethane prepolymer and subsequently blocking the free NCO groups with
   c) at least one hydrocarbon resin containing phenolic OH groups,
   d) in the presence of a catalyst which comprises at least one triorganoamine selected from
      i) compounds of the general formula (I)

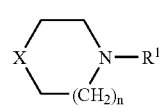

(I)

where
   $R^1$ is an optionally branched $C_1$–$C_{30}$ alkyl radical,
   X is O, S or the group N-$R^1$ and
   n is 0 or 1, and
   ii) compounds of the general formula (II)
   $NR^2R^3R^4$ (II)
   where
   $R^2$ is a $C_3$–$C_{30}$ alkyl, $C_3$–$C_{10}$ cycloalkyl or $C_6$–$C_{30}$ aryl radical and/or the radical —(Y)$_p$(CHR$^5$)$_q$NR$^6$R$^7$, in which q=1 to 5 and $R^5$, $R^6$ and $R^7$ independently of one another are a $C_1$–$C_{30}$ alkyl radical and $R^5$ can also be H, and p=0 or 1 and the radical Y is —C(O)O—, —O—, —NH—CO—, —NH—and/or —N(CH$_3$)—, and
   $R^3$ and $R^4$ independently of one another are an optionally substituted $C_1$–$C_{30}$ alkyl, $C_3$–$C_{10}$ cycloalkyl or $C_6$–$C_{30}$ aryl radical and/or the radical —(Y)$_p$(CHR$^5$)$_q$NR$^6$R$^7$, in which q=1 to 5 and $R^5$, $R^6$ and $R^7$ independently of one another are a $C_1$–$C_{30}$ alkyl radical and $R^5$ can also be H, and p=0 or 1 and the radical Y is —C(O)O—, —O—, —NH—CO—, —NH—and/or —N(CH$_3$)—.

2. The process for preparing phenolically blocked polyurethane prepolymers according to claim 1, wherein component d) comprises a triorganoamine of type ii), which corresponds to formula (III)

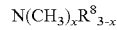

(III)

wherein
x is 1 or 2, and
R$^8$ is an optionally branched and/or substituted C$_3$–C$_{30}$ alkyl radical, C$_5$–C$_6$ cycloalkyl radical or the radical —(N(CH$^3$))$_p$(CH$_2$)$_q$NR$^6$R$^7$ in which q=1 to 5 and R$^6$ and R$^7$ independently of one another is a C$_1$–C$_{30}$ alkyl radical, and p=0 or 1.

3. The process for preparing phenolically blocked polyurethane prepolymers according to claim 2, characterized in that
x=2 and
R$^8$ is C$_3$–C$_{18}$ alkyl, C$_5$–C$_6$ cycloalkyl or —(N(CH$_3$))$_p$(CH$_2$)$_q$N(CH$_3$)$_2$ wherein q=2 or 3, p=0 or 1.

4. Phenolically blocked polyurethane prepolymers obtained by a process which comprises reacting
a) one or more diisocyanates or polyisocyanates with
b) at least one isocyanate-reactive compound with a functionality of at least 1.5 to form an NCO-functional polyurethane prepolymer and subsequently blocking the free NCO groups with
c) at least one hydrocarbon resin containing phenolic OH groups,
d) in the presence of a catalyst which comprises at least one triorganoamine selected from
i) compounds of the general formula (I)

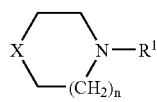

(I)

where
R$^1$ is an optionally branched C$_1$–C$_{30}$ alkyl radical,
X is O, S or the group N-R$^1$ and
n is 0 or 1, and
ii) N,N-dimethyldodecylamine, N,N-dimethylundecylamine, N,N,N',N'-tetramethylhexamethylenediamine and compounds of the general formula (III)

N(CH$_3$)$_x$R$^8$$_{3-x}$     (III)

wherein
x is 1 or 2, and
R$^8$ is an optionally substituted C$_5$–C$_6$ cycloalkyl radical or the radical —(N(CH$_3$))$_p$(CH$_2$)$_q$NR$^6$R$^7$ in which q=1 to 5 and R$^6$ and R$^7$ independently of one another is a C$_1$–C$_{30}$ alkyl radical, and p=0 or 1.

5. Reactive systems comprising
A) one or more polyurethane prepolymers according to claim 4,
B) one or more organic amines having at least two primary amino groups,
C) optionally compounds containing oxirane groups which contain on average more than one oxirane group per molecule,
D) optionally catalysts and/or additives and
E) optionally compounds obtained through reaction of one or more of components A)–D) with one another;
wherein the additives comprise one or more members selected from the group consisting of fillers, solvents, levelling assistants, pigments, solvents, reaction accelerants and viscosity regulators.

6. A method of producing coatings, adhesives, sealants, jointing compounds or mouldings comprising adding one or more additives selected from the group consisting of fillers, solvents, levelling assistants, pigments, solvents, reaction accelerants and viscosity regulators to the prepolymers according to claim 4.

7. Coating, adhesive, sealant, jointing compound or moulding compositions comprising the prepolymers according to claim 4 and one or more additives selected from the group consisting of fillers, solvents, levelling assistants, pigments, solvents, reaction accelerants and viscosity regulators.

8. Substrates coated with coatings according to claim 7.

9. The phenolically blocked polyurethane prepolymers of claim 4 wherein catalyst d) comprises a triorganoamine of type ii) and wherein
x=2 and
R$^8$ C$_5$–C$_6$ cycloalkyl or —(N(CH$_3$))$_p$(CH$_2$)$_q$N(CH$_3$)$_2$ wherein q=2 or 3, p=0 or 1.

10. The phenolically blocked polyurethane prepolymers of claim 4 wherein the catalyst d) comprises at least one of N,N-dimethyldodecylamine, N,N-dimethylundecylamine, N,N,N',N'-tetramethylethylenediamine, N,N,N',N'-tetramethylhexamethylenediamine, N,N,N',N',N''-pentamethyl-diethylenetriamine and N,N-dimethylcyclohexylamine.

11. The process of claim 1 wherein at least 50 mol%, based on the amount of isocyanate groups to be blocked in the polyurethane prepolymer, of the isocyanates groups are blocked with hydrocarbon resin c).

12. The phenolically blocked polyurethane prepolymers of claim 4 wherein at least 50 mol%, based on the amount of isocyanate groups to be blocked in the polyurethane prepolymer, of the isocyanates groups are blocked with hydrocarbon resin c).

13. The process of claim 1 wherein at least 95 mol%, based on the amount of isocyanate groups to be blocked in the polyurethane prepolymer, of the isocyanates groups are blocked with hydrocarbon resin c).

14. The phenolically blocked polyurethane prepolymers of claim 4 wherein at least 95 mol%, based on the amount of isocyanate groups to be blocked in the polyurethane prepolymer, of the isocyanates groups are blocked with hydrocarbon resin c).

* * * * *